United States Patent [19]
Sachdeva et al.

[11] Patent Number: 5,630,914
[45] Date of Patent: *May 20, 1997

[54] METHOD AND APPARATUS FOR DECONTAMINATING A LIQUID

[75] Inventors: Yesh P. Sachdeva, Burlington; Richard L. Gabriel, Swampscott, both of Mass.

[73] Assignee: Pharm-Eco Laboratories, Inc., Lexington, Mass.

[*] Notice: The term of this patent shall not extend beyond the expiration date of Pat. No. 5,562,808.

[21] Appl. No.: 478,945

[22] Filed: Jun. 7, 1995

Related U.S. Application Data

[63] Continuation-in-part of Ser. No. 124,971, Sep. 21, 1993, Pat. No. 5,562,808.

[51] Int. Cl.$^6$ .................... B01D 1/14; B01D 1/22; B01D 3/28
[52] U.S. Cl. .................... 203/49; 159/13.4; 159/16.1; 159/26.2; 159/49; 203/72; 203/89; 568/621; 585/807; 585/810
[58] Field of Search .................... 203/72, 49, 89, 203/DIG. 9; 549/369, 377, 263, 512, 541; 568/621, 615; 159/13.4, 14, 49, 13.2, 16.1, 26.2, DIG. 10, DIG. 20; 585/807, 810

[56] References Cited

U.S. PATENT DOCUMENTS

| | | | |
|---|---|---|---|
| 573,219 | 12/1896 | Haubtman | 159/13.4 |
| 1,562,760 | 11/1925 | Harris | 159/13.4 |
| 2,029,826 | 2/1936 | Macallum | 159/13.4 |
| 2,486,684 | 11/1949 | Schlesman et al. | 203/49 |
| 2,720,280 | 10/1955 | Doyle | 183/115 |
| 3,127,243 | 3/1964 | Konikoff | 23/204 |
| 3,555,786 | 1/1971 | Cochran | 55/196 |
| 3,732,668 | 5/1973 | Nichols | 55/160 |
| 3,830,706 | 8/1974 | Kogan | 159/13.4 |
| 3,970,511 | 7/1976 | Rat et al. | 159/13 |
| 4,285,881 | 8/1981 | Yang | 549/377 |
| 4,306,058 | 12/1981 | Copelin | 528/498 |
| 4,375,437 | 3/1983 | Katz et al. | 260/990 |
| 4,405,799 | 9/1983 | Chakrabarti et al. | 549/369 |
| 4,443,634 | 4/1984 | Ziegenhain et al. | 568/621 |
| 4,946,561 | 8/1990 | Braun et al. | 203/49 |
| 5,061,458 | 10/1991 | Miller | 422/173 |

FOREIGN PATENT DOCUMENTS

| | | |
|---|---|---|
| 128903 | 1/1901 | Germany . |
| 057556 | 4/1982 | Japan . |

OTHER PUBLICATIONS

Power "High Velocity Evaporator in Single and Multiple Effects", Aug. 27, 1929.

Saito, Y. et al., "The Determination of the Poly(oxyethylene) Oligomer Distribution in a Non-Ionic Surfactant by Means of Thin-Layer Chromatography," *Bull. Chem. Soc. Jpn.*, 62(11):3709–3710 (1989).

Desbene, P.L. et al., "Polarographic Detection of Non-Ionic Surfactants Analyzed by Reversed-Phase Partition Chromatography," *J. Chromatography*, 465:69–74 (1989).

Desbene, P.L et al., "Analytical Study of Non-Ionic Surfactants Used in Enhanced Oil Recovery," *J. Chromatography*, 461:305–313 (1989).

Levsen, K. et al., "On-Line Liquid Chromatography-Mass Spectrometry Analysis of Non-Ionic Surfactants," *J. Chromatography*, 323:135–141 (1985).

*Chemical Abstracts*, 71(16):7710g, Moryashchev, A.K. et al., "Chromatographic Analysis of 4-Methyl-4-Phenyl-1, 3-Dioxane," *Gazov. Kromatogr.*, 8:89–90 (Russian Abstract No. 24G242) (1968).

(List continued on next page.)

Primary Examiner—Virginia Manoharan
Attorney, Agent, or Firm—Hamilton, Brook, Smith & Reynolds, P.C.

[57] ABSTRACT

A method for decontaminating a liquid of a contaminant having a vapor pressure which is higher than the vapor pressure of the liquid. A contaminated liquid is directed through an inclined conduit. A gas is directed into the inclined conduit, whereby the gas contacts the liquid and transports the contaminant, which has volatilized in the inclined conduit, out of the inclined conduit, thereby decontaminating the liquid. The liquid is discharged from the inclined conduit.

16 Claims, 4 Drawing Sheets

OTHER PUBLICATIONS

*Chemical Abstracts*, 105(16):1359h, Linde, Karl Heinz, "Purification of Aqueous Surfactant Mixtures Based on Alkyl and/or Alkylaryl Polyglycol Ether Sulfate Salts," Abstract of German Patent No. 3447867.

*Chemical Abstracts*, 110(3):23341r, Sasa, Y. et al., "Preparation of Alkyl Ether Sulfate or Phosphate Salts with Low Dioxane Content," (Abstract of Japanese Patent No. 63246357).

*Chemical Abstracts*, 115(2):9673x, Leuteritz, G.M., "Process and Apparatus for Safe and Pollution–Free Preparation of Highly Pure Alkylene Oxide Adducts," (Abstract of European Patent Application Publication No.: EP 419419 A1).

METHOD AND APPARATUS FOR DECONTAMINATING A LIQUID

RELATED APPLICATION

This application is a Continuation-in-Part of U.S. patent application Ser. No. 08/124,971, filed on Sep. 21, 1993, U.S. Pat. No. 5,562,808, the teachings of which are herein incorporated by reference.

BACKGROUND OF THE INVENTION

Liquid polymers are useful in many food and pharmaceutical products. Many liquid polymers are formed in a liquid-phase reaction wherein the liquid phase is often the solvent, such as 1,4-dioxane (diethylene ether, hereinafter "dioxane"). Recent evidence indicates that dioxane and other solvents are carcinogenic, even when present in very small concentrations. Consequently, use of liquid polymers in consumer products generally requires that the liquid polymer substantially be decontaminated of dioxane. For example, products to which plants or animals are exposed generally must have a dioxane content of less than about five parts per million. Pharmaceutical and cosmetic requirements are even more strict, limiting dioxane contents in products to less than about 0.5 parts per million.

Several attempts to remove dioxane from surfactants have been made. In one method, dioxane is removed by vacuum stripping the dioxane from the surfactant. However, vacuum stripping and other distillation-like methods commonly result in excessive foaming by the surfactant during volatilization of the dioxane. Prolonged heating of the surfactant can reduce the amount of foaming, but typically will also cause significant decomposition of the surfactant.

In another method, dioxane is removed from the surfactant by partitioning with an appropriate organic solvent, which can extract the dioxane. However, a portion of the organic solvent typically remains in the surfactant. Removal of the residual organic solvent from the surfactant is generally difficult and expensive.

SUMMARY OF THE INVENTION

The present invention relates to a method and apparatus for decontaminating a liquid, an oil or liquid polymer in particular, of a contaminant having a vapor pressure which is higher than the vapor pressure of the liquid.

The method includes directing a contaminated liquid into an inclined conduit at an upper portion of the conduit to form a thin film of liquid which flows along and through the inclined conduit, whereby the contaminant is volatilized. A gas is directed through the conduit and over the thin film of liquid to transport the contaminant, which has volatilized in the conduit, out of the conduit, thereby decontaminating the liquid. The liquid is discharged from a lower portion of the conduit.

The apparatus includes an elevated reservoir for contaminated liquid and an elongate inclined conduit, which has an upper portion for receiving a stream of the contaminated liquid from the elevated reservoir and a lower portion for discharge of decontaminated liquid. A heat source is suitable for heating contaminated liquid in the elongate inclined conduit in an amount sufficient to cause the contaminant of the liquid to volatilize, thereby decontaminating the liquid. A gas source is suitable for directing a gas through the inclined conduit to transport volatilized contaminant out of the conduit. A receptacle is connected to the elongate inclined conduit for receiving the decontaminated liquid discharged from the inclined conduit.

Another embodiment of the apparatus includes an elevated reservoir for the contaminated liquid. An upper elongate inclined conduit has an upper portion for receiving a stream of the contaminated liquid from the elevated reservoir and a lower portion for discharge of decontaminated liquid. The upper inclined conduit has a first heat source for heating contaminated liquid in the upper inclined conduit in an amount sufficient to cause a first portion of the contaminant of the liquid to volatilize, thereby at least partially decontaminating the liquid. A middle elongate inclined conduit has an upper portion for receiving a stream of the partially contaminated liquid from the upper elongate inclined conduit and a lower portion for discharge of decontaminated liquid. A first conduit connector has a first narrow constriction for directing the decontaminated liquid discharged from the upper inclined conduit to the middle elongate inclined conduit and a gas by-pass for diverting gas from the middle elongate inclined conduit around the first narrow constriction connector to the upper elongate inclined conduit. The middle elongate inclined conduit has a second heat source for heating the contaminated liquid in the middle elongate inclined conduit in an amount sufficient to cause a second portion of the contaminant of the liquid to volatilize, thereby further decontaminating the liquid. A lower elongate inclined conduit has an upper portion for receiving a stream of the further decontaminated liquid from the middle inclined conduit and a lower portion for discharge of decontaminated liquid. A second conduit connector has a second narrow constriction for directing the further decontaminated liquid discharged from the middle inclined conduit to the lower elongate inclined conduit and a gas by-pass for diverting gas from the lower elongate inclined conduit around second narrow constriction to the middle elongate inclined conduit. The lower inclined conduit has a third heat source for heating the further decontaminated liquid in the lower inclined conduit in an amount sufficient to cause a third portion of the contaminant of the liquid to volatilize, thereby furthermore decontaminating the liquid. The apparatus further includes a gas source for directing a gas through the lower elongate inclined conduit to the middle elongate inclined conduit to the upper elongate inclined conduit to transport the volatilized contaminant out of the lower elongate inclined conduit, middle elongate inclined conduit and upper elongate inclined conduit and a receptacle for receiving the furthermore decontaminated liquid discharged from the lower elongate inclined conduit.

This invention has many advantages, which include the removal of low concentrations of contaminants, such as solvents, from liquids, such as oils or liquid polymers, without applying an excessive amount of heat to the liquid. Further, this method can be practiced at atmospheric pressure, thereby avoiding the use of vacuum distillation which can cause a liquid to foam. Furthermore, a solvent is not used to extract the contaminant.

DETAILED DESCRIPTION OF THE INVENTION

The features and other details of the method and apparatus of the invention will now be more particularly described with reference to the accompanying drawings and pointed out in the claims. The same numeral present in different figures represents the same item. It will be understood that the particular embodiments of the invention are shown by way of illustration and not as limitations of the invention. The principal features of this invention can be employed in various embodiments without departing from the scope of the invention. All parts and percentages are by weight unless otherwise specified.

The present invention relates generally to a method and apparatus for decontaminating a liquid, such as an oil or liquid polymer, of a contaminate having a vapor pressure which is higher than the vapor pressure of the oil or liquid polymer.

Figure 1:
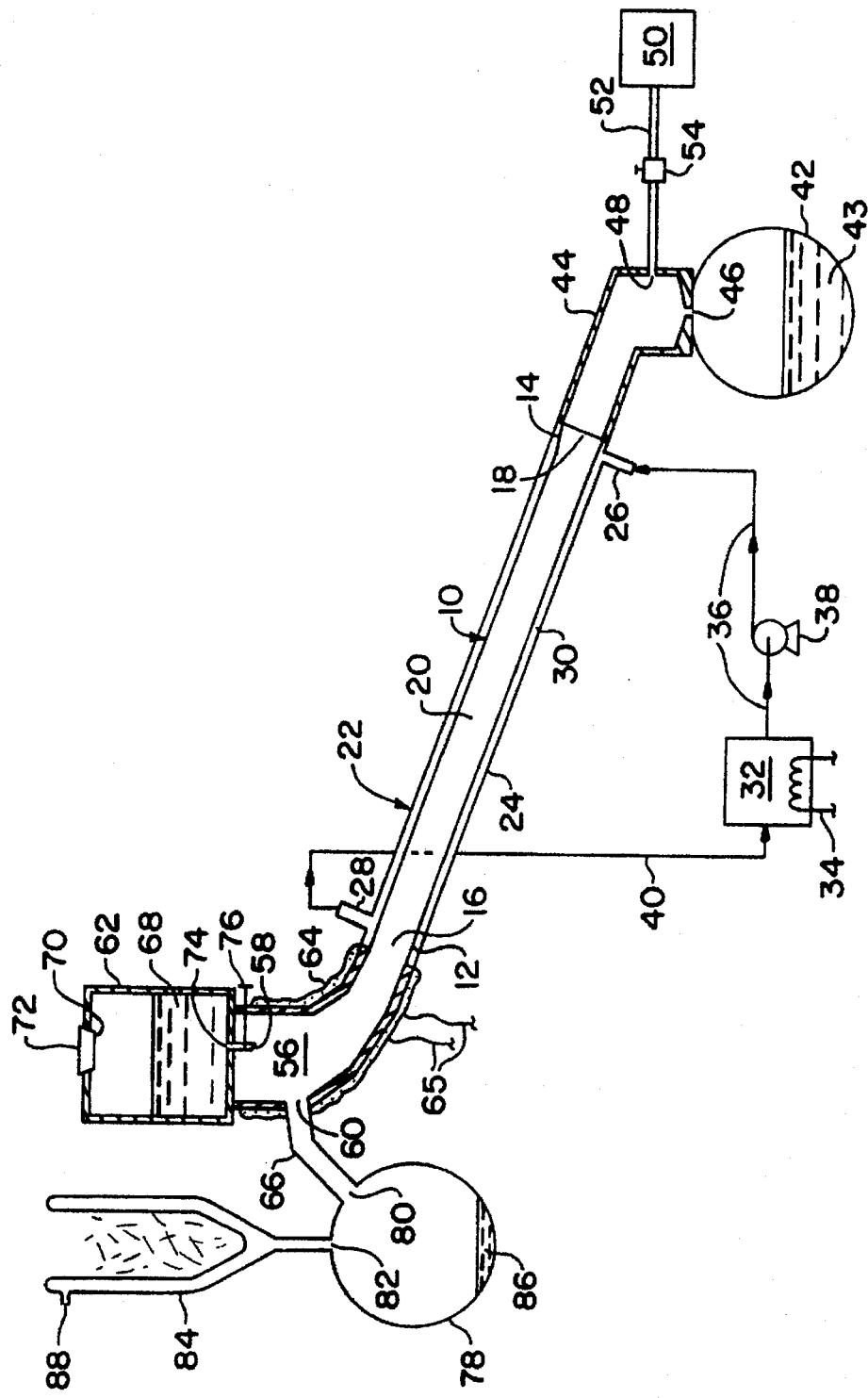
FIG. 1 is a cut-away side elevational view of one embodiment of an apparatus of this invention.

One embodiment of the invention is shown in FIG. 1. The decontamination apparatus includes inclined conduit 10. Inclined conduit 10 includes upper portion 12 and lower portion 14. First opening 16 at upper portion 12 is suitable for receiving a liquid contaminated with contaminant. Second opening 18, which is located at lower portion 14, is suitable for receiving liquid from inclined conduit 10. Preferably, inclined conduit 10 has a substantially constant diameter. In a particularly preferred embodiment, inclined conduit 10 has a constant diameter of about three centimeters and is inclined at an angle of about twenty degrees from the horizontal.

A suitable gas is one which can cause a contaminant, such as a solvent or dioxane, of a liquid to volatilize and separate from the liquid, and which can direct the volatilized contaminant with the gas out of the conduit. The solvent contaminant can be ethers and halogenated compounds including chlorinated compounds. Examples of a contaminant are dimethyl formamide, benzene and chlorobenzene. In one embodiment, the gas is substantially inert in the presence of the liquid and the contaminant. Examples of such gases include nitrogen, helium, argon, carbon dioxide, etc., or a combination thereof. Other gases include organic gases, such as methane, and vaporized liquids, such as ethanol, that are non-reactive with the liquid and contaminant. These gases, preferably, have a low relative humidity to minimize contamination of water with the liquid and to enhance volatilization of the contaminant.

Suitable liquid which can be decontaminated of contaminate by the method and apparatus of the invention include ionic and non-ionic surfactants that have a lower vapor pressure than the dioxane contaminant at the temperature at which the dioxane is decontaminated from the surfactant. An example of a suitable surfactant is polyethylene oxide. Preferably, the surfactants are fluoro substituted surfactants, such as fluoropolyethylene oxide. Other liquids include oils, such food or cooking oils, in particular, vegetable or corn oil. Also, the liquid can include liquid polymers, such as epoxies or polymers formed from diols. Further, liquid polymers, which have a glass transition temperature of about 15° C. or less, are suitable and include silicones, polydienes, epoxies, phosphazenes, ethers, thioethers, acrylates, esters, caprolactones, sulfides, azalates, chlorinated alkanes and styrenes.

Inclined conduit 10 has means for heating inclined conduit 10 and conduit interior 20. Suitable means for heating include heat exchanger 22 or heating the tape, not shown. Heat exchanger 22 includes shell 24, which extends along inclined conduit 10. Heat exchanger inlet 26 is at shell 24 and proximate to lower portion 14 of inclined conduit 10. Heat exchanger outlet 28 is at shell 24 which is proximate to upper portion 12 of inclined conduit 10. Heated cavity 30 extends between inclined conduit 10 and shell 24 for receiving heat exchanger medium from heat exchanger inlet 26 and for conducting the medium along inclined conduit 10 to heat exchanger outlet 28. Heat exchanger medium is received from heat exchanger medium source 32. Heat exchanger source 32 has heating means 34 for heating the heat exchanger medium to a suitable temperature for heat exchanger 22, such as in the range of between about 120° and 160° C. The heat exchanger medium is directed to heat exchanger inlet 26 through line 36 by pump 38 and is returned to heat exchanger medium source 32 through line 40 from heat exchanger outlet 28.

Heated chamber 56 is connected at upper portion 12 to first opening 16 of inclined conduit 10. Heated chamber 56 has chamber inlet 58 and chamber outlet 60. Chamber inlet 58 is suitable for receiving the contaminated liquid from reservoir 62. Heated chamber 56 has heating means 64. An example of a suitable heating means 64 is an electrical heating tape that is wrapped around heated chamber 56 and which is connected to an electrical power source by wires 65. Heating means 64 has sufficient heating capacity to heat the contaminated liquid to a temperature at which a substantial amount of the contaminant can volatilize. Chamber outlet 60 is connected to collector conduit 66 for removing vaporized contaminate with the heated gas from heated chamber 56.

Reservoir 62 is suitable for holding contaminated liquid 68 and has reservoir inlet 70 for receiving the contaminated liquid and seal 72 for sealing reservoir 62 during operation of the decontamination apparatus. Reservoir 62 has reservoir outlet 74 for directing contaminated liquid from reservoir 62 to heated chamber 56. Reservoir valve 76 is located at reservoir outlet 74 to control the flow of contaminated liquid from reservoir 62 to heated chamber 56. The required flow rate of the liquid from reservoir 62 to volatilize the contaminant in the liquid in inclined conduit 10 will depend upon the temperature of the liquid as it flows through inclined conduit 10, the size of inclined conduit 10, and the pressure in inclined conduit 10. In one embodiment, about fifty drops per minute are directed from reservoir 62 through valve 76 into inclined conduit 10.

Contaminant collector 78, which is configured for receiving contaminant, is connected to heated chamber 56 by collector conduit 66. Contaminant collector 78 has collector inlet 80 and collector outlet 82. Collector inlet 80 receives heated gas with the contaminant from heated chamber 56 through collector conduit 66. Condenser 84 is located at collector outlet 82 and has sufficient capacity to cool the heated inert gas, whereby contaminant contained in the gas is condensed, thereby allowing contaminant to flow back into contaminant collector 78 and collect in contaminant pool 86. In one embodiment, condenser 84 is dry ice-cooled and has a temperature of about −78° C. The cooled gas is allowed to flow out of condenser 84 through condenser outlet 88 to the atmosphere substantially free of contaminant.

Liquid collector 42, which is suitable for receiving decontaminated liquid 43, is connected to conduit outlet 18 at lower portion 14 to liquid collector conduit 44. Liquid collector 42 is located lower than conduit outlet 14 to allow the liquid, which is substantially decontaminated of the contaminant, to flow freely from inclined conduit 10 through liquid collector conduit 44 to liquid collector inlet 46.

Liquid collector conduit 44 has gas inlet 48 for directing a continuous gas stream from gas source 50 through gas tube 52. The flow of continuous gas stream is controlled by valve 54 into liquid collector conduit 44 and inclined conduit 10.

Inclined conduit 10 is constructed of a suitable material, such as glass or metal, which allows the liquid to flow from first opening 16 to second opening 18 in the form of a continuous thin liquid film.

In one embodiment of the method of the invention, the contaminated liquid is directed from reservoir 62 through reservoir outlet 74 to heated chamber 56. The contaminated liquid has a contaminant that has a higher vapor pressure than the vapor pressure of the liquid. The concentration of the contaminant should be less than five percent. Preferably, it should be less than one percent. More preferably, the concentration of contaminant should be less than a half of a percent. In one embodiment, the liquid is a surfactant and has a concentration of dioxane contaminant in the range of between about 5,000 and 20,000 parts per million. The concentration of contaminant can be determined by various methods, such as gas chromatography, high pressure liquid chromatography and mass spectroscopy. The flow of the contaminated liquid is controlled by reservoir valve 76 at a rate of between about 45 and 55drops per minute of liquid. The drops are directed through heated chamber 56, which is heated to a temperature of about 150° C. A gas, such as nitrogen, is directed from gas source 50 through gas tube 52 to gas inlet 48. The flow of gas is controlled by valve 54. The liquid is conducted from first opening 16 through inclined conduit 10 to second opening 18. The gas is directed from gas inlet 48 through inclined conduit 10 and is heated to a temperature of about 140° C. therein. The gas is directed through inclined conduit 10 at a rate of between about sixty and ninety milliliters per minute. As the gas is directed through inclined conduit 10, the contaminant volatilizes from the heated liquid on inclined conduit 10, thereby decontaminating the liquid.

The volatilized contaminant is conducted from inclined conduit interior 20 through first opening 16 to heated chamber 56 to collector conduit 66 into contaminant collector 78. The gas is directed from contaminant collector 78 through condenser 84. Condenser 84 sufficiently cools the contaminant contained in the heated gas to a temperature which causes a substantial condensation of the contaminant, whereby the condensated contaminant is returned to contaminant collector 78 and is collected. The decontaminated liquid is drained from inclined conduit 10 into liquid collector 42 and is cooled, thereby decontaminating the contaminant from the liquid. The decontaminated liquid can have a contaminant concentration of about one hundred parts per million or less. In another embodiment, the concentration is about ten parts per million.

Figure 2:
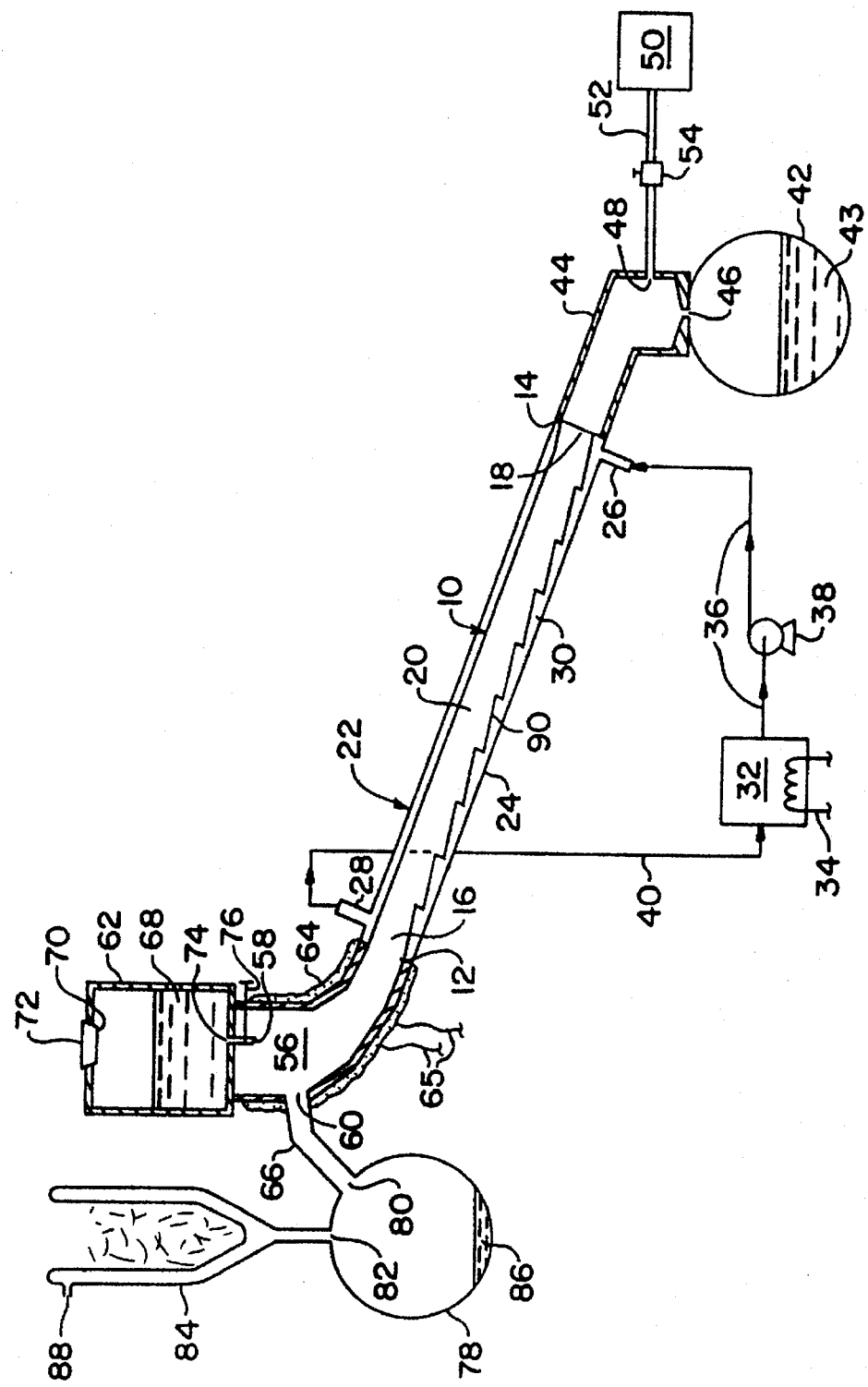
FIG. 2 is a cut-away side elevational view of another embodiment of an apparatus of this invention.

FIG. 2 illustrates another embodiment of this invention. The apparatus of FIG. 2 has many of the same elements of FIG. 1 and like elements are designated with like numerals. This apparatus has an inclined conduit that has a series of steps 90, thereby allowing an increased surface area within a specific length of the conduit.

Figure 3:
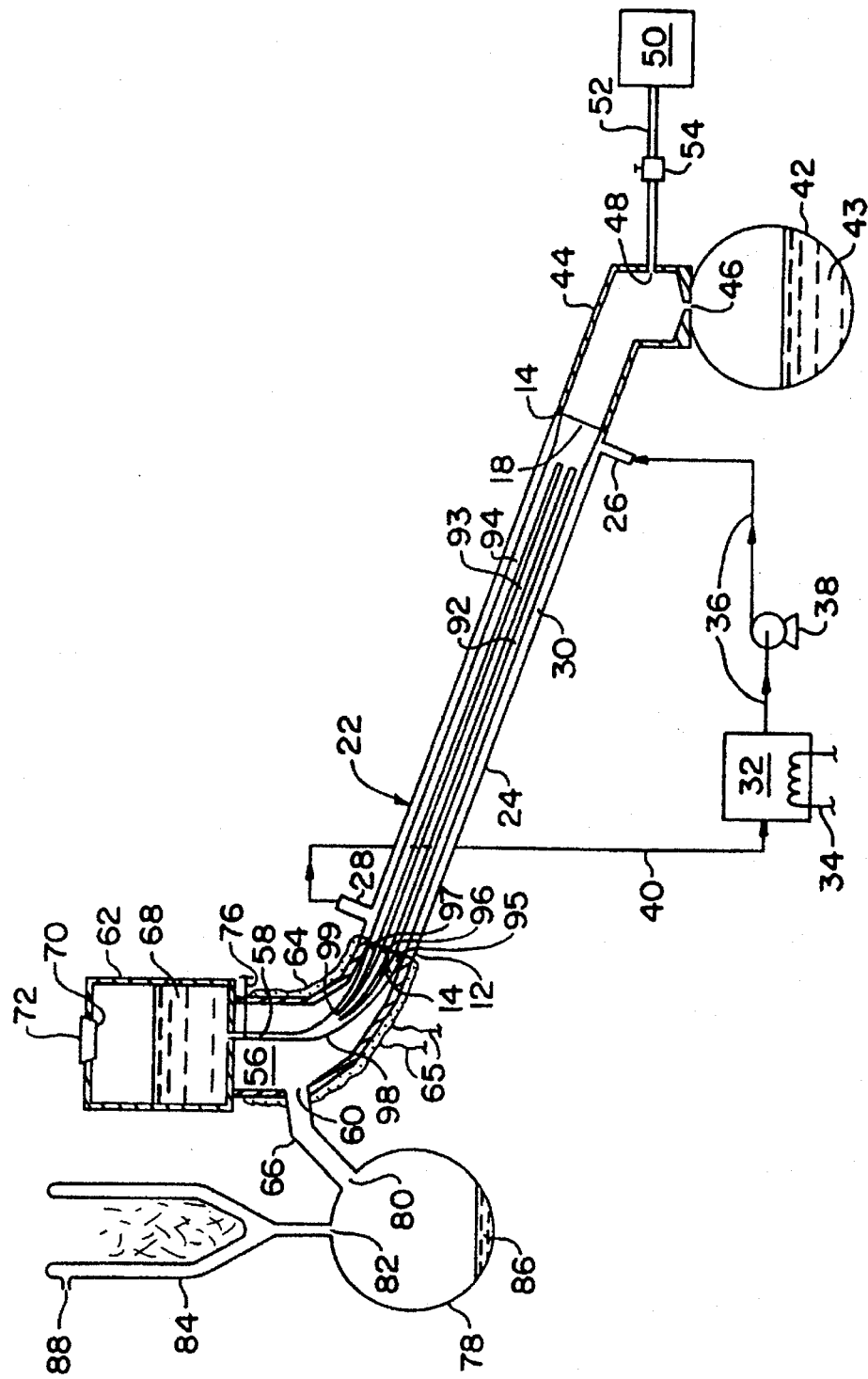
FIG. 3 is a cut-away side elevational view of a third embodiment of an apparatus of this invention.

Further, FIG. 3 illustrates another embodiment of this invention. Again, the apparatus of FIG. 3 has many the same elements of FIG. 1 and like elements are designated with like numerals. This apparatus has a series of inclined conduits in parallel within shell 24, thereby allowing a greater amount of surface area for forming a continuous thin film per unit length of inclined conduit. In the cut-away view of FIG. 3, three conduit pipes 92,93,94 are located within shell 24. Conduit pipes 92,93,94 have the same diameter and have the same length which extends the length of shell 24. Conduit pipes 92,93,94 are bundled in such a manner to allow the heat exchanger medium to flow between conduit pipes 92,93,94 to substantially heat the pipes to the same temperature. Conduit pipes 92,93,94 has a similar construction as inclined conduit 10 in shell 24.

Chamber tube 98 is located within heated chamber 56. The upper portion of chamber tube 98 is connected to chamber inlet 58. Chamber tube 98 at point 99 is evenly divided into a series of branches 95,96,97 which are equal in number to the number of conduit pipes and allows the contaminated liquid to sufficiently heat and evenly divide the amount of liquid to flow in an equal amount into each conduit tube 92,93,94 while allowing the inert gas to flow through conduit tubes 92,93,94 to heated chamber 56.

Figure 4:
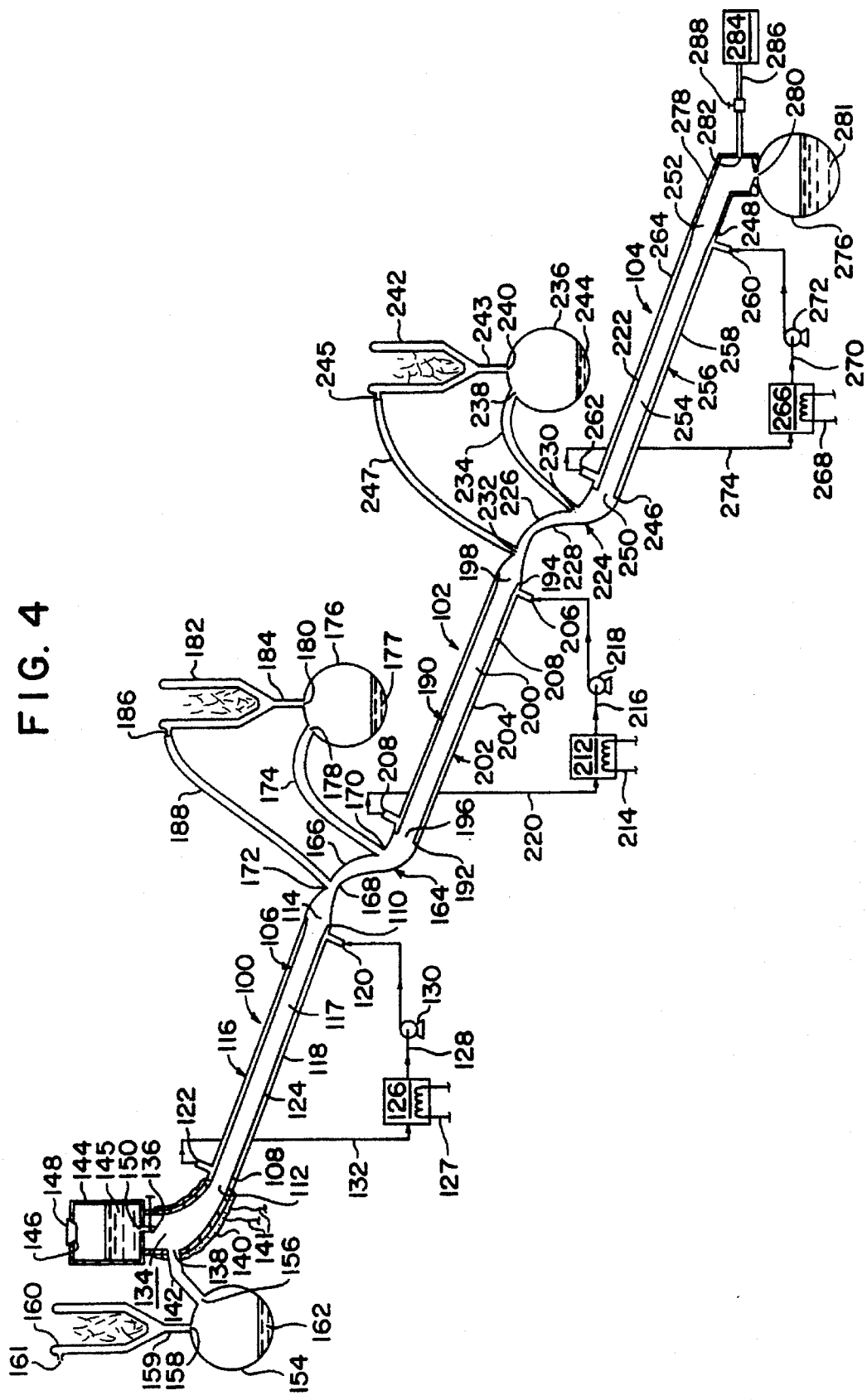
FIG. 4 is a cut-away side elevational view of a fourth embodiment of an apparatus of this invention.

Furthermore, FIG. 4 illustrates another embodiment of this invention. Although the embodiment is exemplified with a surfactant contaminated with a dioxane, other oils and liquid polymers that are contaminated by solvents or other compounds that have a higher vapor pressure than the vapor pressure of the liquid can be used. This apparatus is a series of inclined conduits. In a cut-away view of FIG. 4, the apparatus has upper section 100, middle section 102 and lower section 104. Upper section 100 has upper inclined conduit 106 which includes upper portion 108 and lower portion 110. First opening 112 at upper portion 108 is suitable for receiving a surfactant contaminated with dioxane. Second opening 114, which is located at lower portion 110, is suitable for receiving surfactant from upper inclined conduit 106. Upper inclined conduit 106 is similar in construction and shaped as conduit 10 described in FIG. 1.

Upper inclined conduit 106 has means for heating upper inclined conduit and upper conduit interior 117. Suitable means for heating includes upper heat exchanger 116 which includes upper shell 118 which extends along upper inclined conduit 106. Heat exchanger inlet 120 is at upper shell 118 and proximate to lower portion 110 of upper inclined conduit 106. Heat exchanger outlet 122 is at upper shell 118 which is proximate to the upper portion 108 of upper inclined conduit 106. Upper heated cavity 124 extends between upper inclined conduit 106 and upper shell 118 for receiving heat exchanger medium from heat exchanger inlet 120 and for conducting the medium along upper inclined conduit 106 to the heat exchanger outlet 122. Heat exchanger medium is received from first heat exchanger source 126. First heat exchanger source 126 has heating means 127 for heating the heat exchanger medium to a suitable temperature for upper heat exchanger 116, such as in the range of between about 120° and about 160° C. The heat exchanger medium is directed to heat exchanger inlet 120 through line 128 by pump 130 and is returned to the heat exchanger medium source through line 132 from heat exchanger outlet 122.

Heated chamber 134 is connected at upper portion 108 to first opening 112 of upper inclined conduit 106. Heated chamber 134 has chamber inlet 136 and chamber outlet 138. Heated chamber 134 has a similar construction as heated chamber 50 of FIG. 1. Included in heated chamber 134 is heating means 140. An example of a suitable heating means 140 is an electrical heating tape that is wrapped around heated chamber 140 and which is connected to an electrical power source by wires 141. Heating means 140 has sufficient capacity to heat the surfactant contaminated with dioxane to a temperature at which a substantial amount of dioxane can volatilize. Chamber outlet 138 is connected to collector conduit 142 for removing vaporized dioxane with the heated gas from heated chamber 134.

Reservoir 144 is suitable for holding dioxane-contaminated surfactant and has a similar construction as reservoir 62 as described in FIG. 1. Reservoir 144 has similar elements which include contaminated surfactant 145, reservoir inlet 146 for receiving the dioxane-contaminated surfactant and seal 148 for sealing reservoir during operation of decontamination apparatus. Reservoir 144 has reservoir outlet 150 for directing dioxane-contaminated surfactant from reservoir to heated chamber 134. Reservoir valve 152 is located at reservoir outlet 150 similar to reservoir outlet 74 described in FIG. 1.

Dioxane collector 154, which is configured for receiving dioxane, is connected to heated chamber 134 by collector conduit 142. Dioxane collector 154 is similar to dioxane collector 78, as described in FIG. 1, and has collector inlet 156 and collector outlet 158. Collector inlet 156 receives heated gas with dioxane contaminant from heated chamber 134 through collector conduit 142. Collector outlet 158 is connected to condenser 160 by condenser inlet 159. Condenser 160 has sufficient capacity to cool the heated inert gas, whereby dioxane contaminant contained in the gas is condensed, thereby allowing dioxane contaminant to flow back into dioxane collector 154 and collect in dioxane pool 162. The cooled gas is allowed to flow out of condenser 160 through condenser outlet 161 to the atmosphere substantially free of dioxane contaminant. In a preferred embodiment, condenser 160 is a dry-ice cooled condenser.

Lower portion 110 of upper section 100 is connected to middle section 102 by first conduit section 164. First conduit section 164 has first conduit connector 166 which narrows significantly at narrow constriction 168 along first conduit connector 166, whereby essentially only the liquid surfactant can pass through narrow constriction 168. First conduit section 164 has gas outlet 170 and gas inlet 172 which are disposed on opposite sides of the narrow constriction 168 of first connector conduit 166. Gas outlet 170 is connected to outlet tube 174 which is connected to middle dioxane collector 176. Middle dioxane collector 176 has middle dioxane collector inlet 178 and middle dioxane collector outlet 180. Middle dioxane collector outlet 180 is connected to condenser 182 by condensing means inlet 184. Condenser outlet 186 is connected to tube 188 which is connected to gas inlet 172 which is located above narrow constriction 168 of conduit section 164. This configuration allows essentially all of the inert gas which flows into first conduit section 164 to flow through outlet tube 174 to middle collector 176 to condenser 182 through inlet tube 188 and into lower portion 110 of upper section 100. Condenser 182, such as a dry-ice cooled condenser, has sufficient cooling capacity to cool the heated inert gas, whereby a portion of the dioxane contaminant contained in the gas is condensed, thereby allowing dioxane contaminant to flow back into middle dioxane collector 176 then collect in dioxane pool 177.

Middle inclined conduit 190 includes upper portion 192 and lower portion 194. First opening 196 at upper portion 192 suitable for receiving a surfactant contaminated partially with dioxane. Second opening 198 which is located at lower portion 194 of middle inclined conduit 190 is suitable for receiving surfactant from middle inclined conduit 190. Preferably, middle inclined conduit 190 is configured similarly to conduit 10 as described in FIG. 1.

Middle inclined conduit 190 has means for heating middle inclined conduit and middle conduit interior 200. Suitable means for heating include heat exchanger 202. Heat exchanger includes middle shell 204 which extends along middle inclined conduit 190. Heat exchanger inlet 206 is proximate to the lower portion 194 of middle inclined conduit 190. Heat exchanger outlet 208 is at middle shell 204 which is proximate to upper portion 192 of middle inclined conduit 190. Middle heated cavity 210 extends between middle inclined conduit 190 and middle shell 204 for receiving heat exchanger medium from heat exchanger inlet 206 and for conducting the medium along middle inclined conduit 194 to heat exchanger outlet 208. Heat exchanger medium is received from heat exchanger medium source 212. Heat exchanger source 212 has heating means 214 for heating the heat exchanger medium to a suitable temperature for heat exchanger 202, such as in the range of between about 120° and 160° C. The heat exchanger medium is directed to heat exchanger inlet 206 through line 216 by pump 218 and is returned to heat exchanger medium source 212 through line 220 from heat exchanger outlet 208.

Middle inclined conduit 190 is connected to the lower inclined conduit 222 by second conduit section 224. Second conduit section 224 has second conduit connector 226 which has narrow constriction 228 through which essentially only surfactant can pass. Second conduit connector 226 has gas outlet 230 and gas inlet 232 which are disposed on either side of narrow constriction 228 of second conduit connector 224. Gas outlet 230 is connected to tube 234 which is connected to third dioxane collector 236 which is configured for collecting dioxane. Third dioxane collector 236 has collector inlet 238 and collector outlet 240. Collector inlet 238 receives heated gas with dioxane contaminant from lower section 104 through tube 234. Condenser 242 has condenser inlet 243, which collector outlet 240 is located at the collector outlet 240 and has sufficient cooling capacity to cool the heated inert gas, whereby the portion of the dioxane contaminant contained in the gas is condensed, thereby allowing dioxane contaminant to flow back into lower dioxane collector 236 then collect in dioxane pool 244. Condenser outlet 245 is connected to tube 247 which is connected to gas inlet 232 which is located above narrow constriction 228 on second conduit section 224. This configuration allows essentially all of the inert gas which flows into second conduit section 224 to flow through outlet tube 234 into lower collector 236 to lower condenser 242 through inlet tube 247 and into lower portion 194 middle inclined conduit 190 of middle section 102.

Lower inclined conduit 222 includes upper portion 246 and lower portion 248. First opening 250 at upper portion 246 is suitable for receiving a surfactant which can be at least partially contaminated with dioxane. Second opening 252 which is located at lower portion 248 is suitable for receiving surfactant from lower inclined conduit 222. Preferably, lower inclined conduit 222 has a similar configuration as conduit 10 described in FIG. 1.

Lower inclined conduit 222 has means for heating lower inclined conduit in lower conduit interior 254. Suitable means for heating includes heat exchanger 256 or heating tape, which is not shown. Heat exchanger 256 includes lower shell 258 which extends along lower inclined conduit 222. Heat exchanger inlet 260 is at lower shell 258 proximate to lower portion 248 of lower inclined conduit 222. Heat exchanger 262 outlet is at lower shell 258 which is proximate to upper portion 246 of lower inclined conduit 222. Heated cavity 264 extends between lower inclined conduit 222 and lower shell 258 for receiving heat exchanger medium from heat exchanger inlet 260 and for conducting medium along lower inclined conduit 222 to heat exchanger outlet 262. Heat exchanger medium is received from heat exchanger medium source 266. Heat exchanger medium 266 source has means for heating 268 the heat exchanger medium to a suitable temperature for heat exchanger, such as in the range of between about 120° and 160° C. The heat exchanger medium is directed to heat exchanger inlet 260 through line 270 by pump 272 and is returned to heat exchanger medium source 266 through line 274 from heat exchanger outlet 262.

Surfactant collector 276, which is suitable for receiving decontaminated surfactant, is connected to lower inclined conduit 222 at lower portion 248 to surfactant collector conduit 278. Surfactant collector 276, which is similar to surfactant collector 42 described in FIG. 1, is located lower than lower opening 252 to allow the surfactant which is substantially decontaminated of a dioxane contaminant, to flow freely from lower inclined conduit 222 through surfactant collector conduit 278 to surfactant collector inlet 280 to surfactant collector 276, thereby forming a substantially dioxane free surfactant pool 281.

Surfactant collector conduit 278 has gas inlet 282 for directing a continuous gas stream from gas source 284 through gas tube 286. The flow of continuous gas stream is controlled by valve 288 to surfactant collector conduit 278 and lower inclined conduit 222.

The application will now be further explained by following example of the application of the method of the invention for decontaminating a liquid of a contaminant having a vapor pressure which is higher than the vapor pressure of the liquid.

Example

A fluorosurfactant, Zonyl® FSO-100 commercially available from E. I. dupont de Nemours & Co. (duPont) having a general formula of $R_fCH_2CH_2O(CH_2CH_2O)_xH$ where $R_f$ equals $F(CF_2CF_2)_{3-8}$, which was contaminated with a dioxane contaminant at a concentration of 20,000 parts per million, was directed through an apparatus, as shown in FIG. 1, from reservoir 62 through reservoir outlet 74 into heated chamber 56 onto heating means 64. Inclined conduit 10 was smooth and glass-lined and had an inside diameter of three centimeters and a length of about sixty-five centimeters. The dioxane-contaminated surfactant was directed at a rate of fifty drops per minute. Heating means 64 had a surface temperature of about 150° C. Dry nitrogen gas was directed through surfactant conduit 44 at a rate of ninety milliliters per minute. At upper portion 12, the temperature was 150° C. At lower portion 14, the temperature was 150° C.

The fluorosurfactant with dioxane contaminant was directed through inclined conduit 10 for a period of ten hours. During this period of time, 0.25 liters of surfactant was collected in surfactant collector 42. The surfactant collected in collector 42 had less than one part per million of dioxane contaminant after decontamination.

Equivalents

Those skilled in the art will recognize, or be able to ascertain using no more than routine experimentation, many equivalents to the specific embodiments of the invention described specifically herein. Such equivalents are intended to be encompassed in the scope of the claims.

We claim:

1. A method for decontaminating a liquid of a contaminant having a vapor pressure which is higher than the vapor pressure of the liquid, comprising the steps of:

a) introducing a contaminated liquid, said liquid being selected from a group consisting of silicones, polydienes, epoxies, epoxides, phosphazenes, ethers, esters, caprolactones, sulfides, azalates, chlorinated alkanes and styrenes, into an inclined conduit at an upper portion of the conduit to form a thin film of liquid which flows along and through the inclined conduit, whereby the contaminant is volatilized; and b) flowing a gas through the conduit and over the thin film of liquid to transport the contaminant, which has volatilized in the conduit, out of the conduit, thereby decontaminating the liquid.

2. The method of claim 1 further including the step of heating the gas which is directed into the conduit to thereby volatilize the contaminant of the liquid in the conduit.

3. The method of claim 1 further including the step of heating the conduit to thereby cause the contaminant in the liquid to volatilize.

4. The method of claim 3 wherein the gas is directed countercurrently to the direction of flow of the liquid.

5. The method of claim 4 wherein the gas is non-reactive.

6. The method of claim 5 wherein the gas is selected from the group consisting of nitrogen, helium, argon, carbon dioxide, methane, and ethanol.

7. The method of claim 3 wherein the gas is directed concurrently with the direction of flow of the liquid.

8. The method of claim 7 wherein the contaminant concentration of the contaminated liquid is in a range of between about 0.5 and 5.0 percent, by weight.

9. The method of claim 8 wherein a resulting contaminant concentration of the liquid after decontamination is less than about five parts per million.

10. The method of claim 9 wherein the temperature of a heat exchanger medium is in a range of between about 120° and 160° C.

11. A method for decontaminating a liquid polymer of a solvent contaminant having a vapor pressure which is higher than the vapor pressure of the liquid, comprising the steps of:

a) introducing the contaminated liquid polymer, said liquid polymer being selected from a group consisting of silicones, polydienes, epoxies, phosphazenes, ethers, esters, caprolactones, sulfides, azalates, chlorinated alkanes and styrenes and has a glass transition temperature of about 15° C. or less, through an inclined conduit to form a thin film of liquid which flows along the inclined conduit, whereby the solvent contaminant is volatilized; and b) flowing a gas through the conduit and over the thin film of the liquid polymer to transport the solvent contaminant, which has volatilized in the conduit, out of the conduit, thereby decontaminating the liquid polymer.

12. The method of claim 11 wherein the contaminant is dimethylformamide.

13. The method of claim 11 wherein a resulting contaminant concentration of the liquid polymer is less than about one hundred part per million.

14. The method of claim 13 wherein the temperature of a heat exchanger medium is in a range of between about 120° and 160° C.

15. The method of claim 11 wherein the liquid polymer is the epoxies.

16. A method for decontaminating a liquid of a contaminant having a vapor pressure which is higher than the vapor pressure of the liquid, comprising the steps of:

a) introducing a contaminated liquid said liquid being selected from a group consisting of silicones, polydienes, epoxies, epoxides, phosphazenes, ethers, esters, caprolactones, sulfides, azalates, chlorinated alkanes and styrenes, into an upper conduit at an upper portion of the upper conduit to form a first thin film of liquid which flows along and through the upper conduit, whereby the contaminant is volatilized;

b) flowing a gas through the upper conduit and over the first thin film of liquid to transport the contaminant, which has volatilized in the upper conduit, out of the upper conduit, thereby at least partially decontaminating the liquid;

c) discharging the partially decontaminated liquid from a lower portion of the upper conduit into a middle conduit at an upper portion of the middle conduit to form a second thin film of liquid which flows along and through the middle conduit, whereby contaminant is volatilized;

d) flowing a gas through the middle conduit and over the second thin film of the partially decontaminated liquid to transport the contaminant, which has volatilized in the middle conduit, out of the middle conduit, thereby further decontaminating the liquid;

e) discharging the further partially decontaminated liquid from a lower portion the middle conduit into a lower conduit at an upper portion of the lower conduit to form a third thin film of liquid which flows along and through the lower conduit, whereby the contaminant is volatilized; and f) flowing a gas through the lower conduit and over the third thin film of the further partially decontaminated liquid to transport the contaminant, which has volatilized in the lower conduit, out of the lower conduit, thereby decontaminating the liquid.

* * * * *